US010045124B2

(12) United States Patent
Lesso et al.

(10) Patent No.: US 10,045,124 B2
(45) Date of Patent: Aug. 7, 2018

(54) CROSSTALK MITIGATION

(71) Applicant: Cirrus Logic International Semiconductor Ltd., Edinburgh (GB)

(72) Inventors: John Paul Lesso, Edinburgh (GB); Toru Ido, Yokohama (JP)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/380,463

(22) Filed: Dec. 15, 2016

(65) Prior Publication Data

US 2017/0180859 A1 Jun. 22, 2017

Related U.S. Application Data

(60) Provisional application No. 62/270,341, filed on Dec. 21, 2015.

(30) Foreign Application Priority Data

Feb. 16, 2016 (GB) .................................. 1602677.5

(51) Int. Cl.
*H04B 15/00* (2006.01)
*H04R 3/12* (2006.01)

(52) U.S. Cl.
CPC ..................................... *H04R 3/12* (2013.01)

(58) Field of Classification Search
CPC ........................................................ H04R 3/12

(Continued)

(56) References Cited

U.S. PATENT DOCUMENTS

2011/0096931 A1* 4/2011 Ormin ....................... H04R 5/04 381/22
2013/0058494 A1* 3/2013 Kim ....................... H03G 3/301 381/74

(Continued)

FOREIGN PATENT DOCUMENTS

EP 2819431 A1 12/2014
WO 2011051068 A1 5/2011

OTHER PUBLICATIONS

Combined Search and Examination Report under Sections 17 and 18(3), Application No. GB1602677.5, dated Jul. 5, 2016, 6 pages.

*Primary Examiner* — Katherine Faley
(74) *Attorney, Agent, or Firm* — Jackson Walker L.L.P.

(57) ABSTRACT

This application describes methods and apparatus for mitigating the effects of crosstalk in multichannel audio. An audio driver circuit (200) for driving first and second audio loads (103) having a common return path ($R_C$), has first and second signal paths (Left and Right). A crosstalk compensation block (205) is configured to add a first compensation signal to the first signal path and add a second compensation signal to the second signal path. The first compensation signal is generated based on the second audio signal and a first compensation function and the second compensation signal is generated based on the first audio signal and a second compensation function. Each of the first and second compensation functions is based on a predetermined impedance value for at least part of the common return path ($R_{H1}$) and is also based on a determined DC impedance value ($Z_L$, $Z_R$) for one of the first and second audio loads which is modified by a band correction factor ($\gamma$). The band correction factor modifies the DC impedance value so it is a better estimate of impedance across the frequency band of interest.

18 Claims, 4 Drawing Sheets

(58) Field of Classification Search
USPC .......................................................... 381/94.3
See application file for complete search history.

(56) References Cited

U.S. PATENT DOCUMENTS

| | | | | |
|---|---|---|---|---|
| 2014/0060289 | A1* | 3/2014 | Hirshberg ................ | G10H 5/00<br>84/654 |
| 2014/0376753 | A1* | 12/2014 | Nystrom ................ | H04R 29/00<br>381/309 |
| 2015/0244325 | A1* | 8/2015 | Irvine .................. | H04B 1/0475<br>375/238 |

* cited by examiner

CROSSTALK MITIGATION

FIELD OF DISCLOSURE

This application relates to methods and apparatus for mitigating the effects of crosstalk in multichannel audio and in particular to methods and apparatus for driving external audio apparatus, such as headphones or the like, that mitigate for the effects of crosstalk.

BACKGROUND

Crosstalk is a known issue where signals transmitted on one channel, e.g. a data channel, may provide an unwanted contribution to signals on another channels. This can be a concern for multichannel audio signals, and may in particular be an issue where the output transducers share a common ground return, as may typically be the case with removably connectable peripheral apparatus with stereo loudspeakers such as headsets/headphones or the like.

FIG. 1 illustrates one example of a stereo audio system 100. FIG. 1 illustrates two audio signal paths, Left and Right, each path having: a digital-to-analogue converter (DAC) 101 for receiving a respective digital audio signal and producing an analogue signal; and an output driver 102 for producing a respective driving signal $V_L$ and $V_R$ for a respective loudspeaker 103. The loudspeakers 103 are connected to a common ground return path. This arrangement may be typical when the audio driving circuitry, e.g. DACs 101 and drivers 102 are part of a host electronic device, such as a portable electronic device for example, which in use is connected to a peripheral apparatus such as a headset via a suitable connector such as a jack plug and jack socket (not shown).

This arrangement, which includes the common return path which can be thought of as having a common impedance $R_C$, can lead to unwanted crosstalk talk between the audio channels as will be recognized by one skilled in the art.

One known approach to reducing the crosstalk is to add to each channel a signal component, derived from the signal of the other channel, which is intended to cancel the crosstalk at the loudspeaker. Thus as illustrated in FIG. 1 the signal from the left channel may be tapped and received by gain element 104 which applies a predetermined gain factor ρ before being mixed with the signal in the right channel by mixer 105. Likewise a signal from the right channel is tapped and mixed with the signal in the left channel by mixer 105 after a predetermined gain λ is applied by gain element 104. Conveniently the mixing in both the left and right channels is performed in the digital domain and thus gain elements 104 are digital gain elements. The effect of this mixing adds a deliberate leakage between the two channels that is intended to mitigate the crosstalk at the loudspeakers.

The gain factors λ and ρ are predetermined and are set so as to cancel crosstalk for an expected load impedance and common impedance $R_C$.

SUMMARY

Embodiments of the present disclosure provide methods and apparatus for improved crosstalk mitigation.

According to an aspect of the present invention there is provided an audio driver circuit for driving first and second audio loads having a common return path, the circuit comprising:

a first signal path for receiving a first audio signal and outputting a first driving signal for driving the first audio load;

a second signal path for receiving a second audio signal and outputting a second driving signal for driving the second audio load;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a predetermined impedance value for at least part of the common return path and is also based on a determined DC impedance value for one of the first and second audio loads which is modified by a band correction factor.

In some embodiments the determined DC impedance value is a measured DC impedance value for one of the first and second audio loads. The audio driver circuit may thus further comprise at least one impedance measuring block configured to determine said measured DC impedance value for at least one of the first and second audio loads when connected.

The band correction factor may be configured such that the determined DC impedance value modified by the band correction factor provides an estimate of the mean impedance of the audio load over a frequency band of interest.

In some embodiments the band correction factor is predetermined. In some embodiments the band correction factor may be selected based on a characteristic of the audio load connected, for instance the determined DC impedance value.

The band correction factor may be a multiplicative factor. The first and second compensation functions may have the form $R_C/(R_C+\gamma Z_{DC})$ where $R_C$ is said predetermined impedance value for at least part of the common return path, $Z_{DC}$ is the determined DC impedance of the audio load and γ is the band correction factor.

In some embodiments the band correction factor is based on a determined inductance of at least one of the first and second audio loads. The first and second compensation functions may have the form $R_C/(R_C+(Z_{DC}+sLe))$ in the s-domain where $R_C$ is said predetermined impedance value for at least part of the common return path, $Z_{DC}$ is the determined DC impedance of the audio load and sLe is the band correction factor and is said determined inductance. The determined inductance may be a measured inductance for one of the first and second audio loads. The audio driver may thus further comprise at least one inductance measuring block configured to determine the inductance for at least one of the first and second audio loads when connected.

The first and second compensation functions may define a gain factor to be applied to the respective second and first audio signals to generate the first and second compensation signals.

In some embodiments the circuit may comprise an impedance measuring block configured to measure the impedance of at least one of the first and second audio loads in use when driven by the respective first or second driving signal. The crosstalk compensation block may configured to control the band correction factor based on the measured impedance in use.

The predetermined impedance value for at least part of the common return path may be a first common impedance value indicative of the impedance of a first part of the common return path, where the first part of the common return path is within a host device hosting the audio driver circuit. The first common impedance value may be based on a measured calibration value of the impedance of the first part of the common return path.

The audio driver circuit may be implemented as an integrated circuit.

Aspects also relate to an electronic apparatus comprising an audio driver circuit as described in any of the variant above. Such an apparatus may further comprise a connector for connecting to a peripheral audio apparatus, the connector having a first contact for receiving the first driving signal for driving the first audio load, a second contact for receiving the second driving signal for driving the second audio load, and a third contact for providing the common return path for second first and second audio loads. The electronic apparatus may be at least one of: a portable device; a battery power device; a computing device; a communications device; a gaming device; a mobile telephone; a personal media player; a laptop, tablet or notebook computing device.

In another aspect there is provided a method of driving first and second audio loads having a common return path, the method comprising:

receiving a first audio signal and outputting a first driving signal for driving the first audio load;

receiving a second audio signal and outputting a second driving signal for driving the second audio load;

generating a first compensation signal based on the second audio signal and a first compensation function and generating a second compensation signal based on the first audio signal and a second compensation function;

wherein each of the first and second compensation functions is based on a predetermined impedance value for at least part of the common return path and is also based on a determined DC impedance value for one of the first and second audio loads which is modified by a band correction factor; and adding the first compensation signal to the first signal path and the second compensation signal to the second signal path.

The method may be implemented in any of the variants described above with reference to the first aspect.

Aspects also relate to software code stored on a non-transitory storage medium which, when run on a suitable processor, performs the method described above.

In a further aspect there is provided an audio driver circuit for driving first and second audio loads having a common return path, the circuit comprising:

a first signal path for receiving a first audio signal and outputting a first driving signal for driving the first audio load;

a second signal path for receiving a second audio signal and outputting a second driving signal for driving the second audio load;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a predetermined first common impedance value for part of the common return path and an impedance value of one of the first or second audio loads modified by a band correction factor.

In a further aspects there is provided an apparatus comprising:

a connector for connecting to a peripheral audio apparatus, the connector having a first contact for providing a first driving signal for a first audio load, a second contact for providing a second driving signal for a second audio load, and a third contact for providing a common return path for second first and second audio loads;

audio driver circuitry having first and second signal paths for receiving first and second audio signals respectively and outputting the respective first and second driving signals;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a predetermined first common impedance value for the common return path within the apparatus and also on an estimate of the mean impedance of one of the first or second audio loads across an operating frequency band.

Aspects also provide crosstalk compensation circuitry for compensating for crosstalk in first and second signal paths for driving respective first and second audio loads having a common return path, the crosstalk compensation circuitry comprising:

a first compensation signal generator configured to generate a first compensation signal for the first signal path, the first compensation signal being based on a signal from the second signal path and a first compensation function;

a second compensation signal generator configured to generate a second compensation signal for the second signal path, the second compensation signal being based on a signal from the first signal path and a second compensation function;

an impedance measuring block configured to determine an impedance of at least one of the first and second audio loads; and a crosstalk compensation controller configured to:

determine a band impedance value for the first and second audio loads based on said determined impedance, said band impedance value being indicative of the impedance over an operating frequency band; and generate the first and second compensation functions based on said determined band impedance value.

Also provided is an audio driver circuit for driving first and second audio loads having a common return path, the circuit comprising:

a first signal path for receiving a first audio signal and outputting a first driving signal for driving the first audio load;

a second signal path for receiving a second audio signal and outputting a second driving signal for driving the second audio load;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a common impedance value for at least part of the common return path and on determined resistance and inductance values of one of the first or second audio loads.

BRIEF DESCRIPTION OF THE DRAWINGS

The invention will now be described by way of example only with reference to the accompanying drawings, of which.

DETAILED DESCRIPTION

Figure 1:
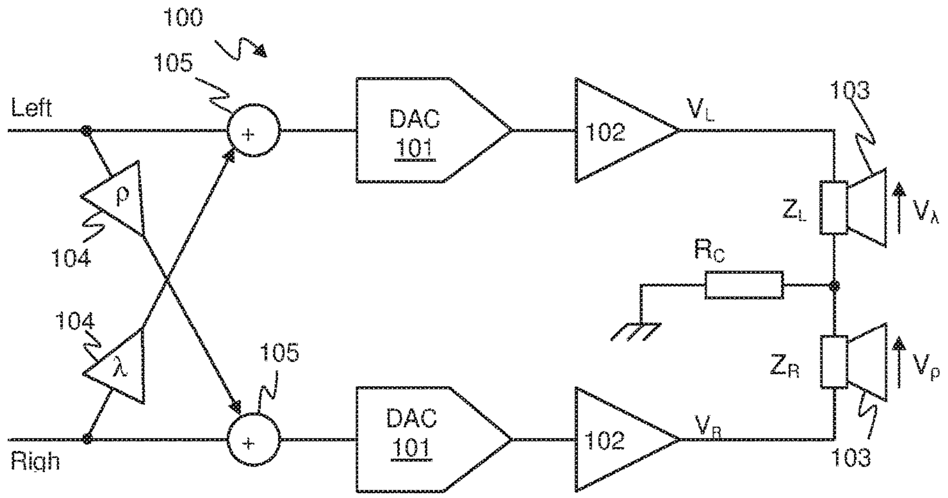
PRIOR ART Figure 1
FIG. 1 illustrates a scheme for crosstalk mitigation.

As mentioned above, FIG. 1 illustrates one example of a multichannel audio system 100, in this case a stereo audio system for driving audio loads, e.g. loudspeakers, with a common return path, e.g. a common return to ground or some other reference voltage. Such an arrangement may be commonly used in electronic devices for driving stereo loudspeakers of a connected peripheral device, e.g. for driving headphones of a removable headset.

As mentioned above the common return path, having an impedance $R_C$, can lead to unwanted crosstalk between the audio channels. The voltage across the left channel loudspeaker in use can be seen as having a component due to the left channel driving signal $V_L$ applied across the left channel loudspeaker, which can be seen simplistically as part of a resistive divider with the effective resistance presented by the common return path and the right channel loudspeaker in parallel. Additionally however there is a component due to the right channel driving signal $V_R$ applied across the left channel loudspeaker as part of a resistive divider formed by the effective resistance of the left channel loudspeaker and ground return path in parallel on one hand and the right channel loudspeaker on the other. The resultant voltage on the left channel loudspeaker $V_\lambda$ can thus be given by:

$$V_\lambda = V_L\left\{\frac{Z_L}{Z_L + R_C \| Z_R}\right\} + V_R\left\{\frac{Z_L \| R_C}{Z_L + R_C \| Z_R}\right\} \quad \text{Eqn. (1)}$$

where $Z_L$ and $Z_R$ are the impedances of the left and right channel loudspeakers respectively and $R_C \| Z_L$ and $R_C \| Z_R$ are the effective impedances of the left and right channel loudspeakers respectively in parallel with the impedance $R_C$ of the common return path. The voltage across the right channel loudspeaker could be determined in a similar way.

As noted previously one known method of crosstalk mitigation is to introduce a deliberate leakage path with a predetermined gain factor between each of the left and right channels.

In such a case the driving signals $V_L$ and $V_R$ are thus a combination of the desired audio driving signal $V_{LS}$ or $V_{RS}$ and the gain adjusted version of the audio signal of the other channel, i.e.

$$V_L = V_{LS} + \lambda V_{RS} \quad V_R = V_{RS} + \rho V_{LS} \quad \text{Eqn. (2)}$$

The gain factors $\lambda$ and $\rho$ may be determined such that if the desired audio signal $V_{LS}$ or $V_{RS}$ is zero the voltage across the corresponding loudspeaker is zero. The relevant gain factors are thus given by:

$$\lambda = \frac{-R_C}{R_C + Z_R} \quad \rho = \frac{-R_C}{R_C + Z_L} \quad \text{Eqn. (3)}$$

The values of $\lambda$ and $\rho$ may be predetermined and based on the known or expected impedance of the audio load, i.e. the impedance of the loudspeaker, and the known or expected impedance of the common return path. In some examples the DC impedance of the loudspeaker may be determined as part of an initialisation step on start-up of the device or connection of a peripheral apparatus and used to set appropriate values for the crosstalk gains $\lambda$ and $\rho$. In other examples the DC impedance of the loudspeaker may be determined from the manufacturer's specification, for example, of the loudspeaker.

It has been appreciated however that the impedance of the loudspeaker varies with frequency. Thus the crosstalk varies with frequency of the audio signal and in some cases the DC value of impedance may not be a good representation of the impedance across the frequency band of interest, e.g. the audio band.

Embodiments of the invention therefore relate to crosstalk mitigation methods and apparatus for driving first and second audio loads having a common return path that provide improved crosstalk mitigation.

Figure 2:
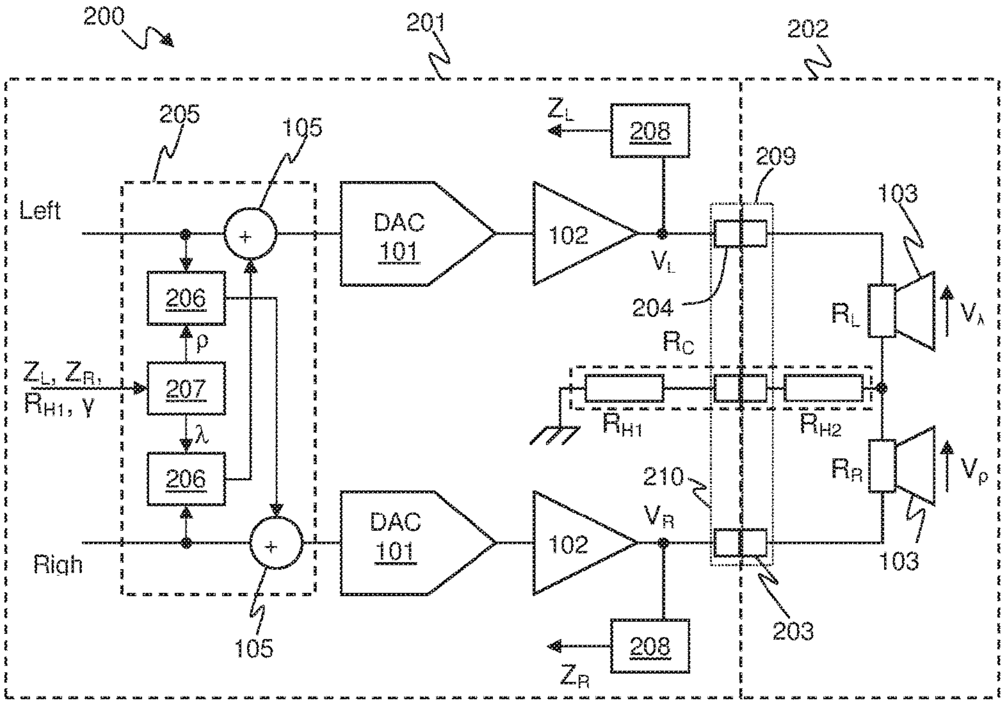
FIG. 2 illustrates an audio system according to an embodiment.

FIG. 2 illustrates an audio system 200 according to an embodiment, where similar components to those discussed above with reference to FIG. 1 are identified using the same reference numerals. Audio driving circuitry in a host device 201 comprises first and second audio signal paths, in this case Left and Right audio channels, for producing first and second driving signals $V_L$ and $V_R$ respectively. Each signal path comprises a DAC 101 and output driver 102. The driving signals are used to drive respective audio loads, in this case loudspeakers 103 of a peripheral or accessory apparatus 202 such as a headset, e.g. a set of headphones, earbuds etc. In use the peripheral apparatus 202 is removably connected to the host device via suitable connectors, such as a jack plug of the peripheral apparatus and a jack socket of the host device but any suitable connectors may be used. In general a suitable contact 203 of the peripheral apparatus will, in use, be coupled to a suitable contact 204 of the host device. The loudspeakers of the peripheral apparatus share a common return path, in this example to ground, and thus there are common contacts 203 and 204 for both loudspeakers to the common return path. Dotted box 209 indicates a plug connector having the contacts 203 and dotted box 210 indicates a socket connector having the contacts 204.

The audio driving circuitry of the host device 201 also includes a crosstalk compensation block 205 for compensating for or mitigating the effects of crosstalk between the left and right audio channels. The crosstalk compensation block adds a first compensation signal to the first signal path, e.g. the left audio channel, the first compensation signal being based on the second audio signal, i.e. the right channel audio signal, and a first compensation function. In some embodiments the first compensation function defines a gain factor λ applied to the right audio signal before being added to the left channel audio to provide crosstalk mitigation. Likewise the crosstalk compensation block 205 also adds a second compensation signal to the right audio channel based on the left audio signal to which a gain factor ρ, based on a second compensation function, has been applied.

The crosstalk compensation block 205 thus has compensation signal generators 206 for receiving tapped versions of the audio signals and generating the first and second compensation signals based on the respective compensation functions. In some embodiments a compensation block controller 207 may control operation of the compensation signal generators 206, e.g. by providing suitable gain factors λ and ρ. In some embodiments the compensation signal generators 206 may thus be gain elements. As illustrated the compensation signals may advantageously be applied in a digital part of the signal path but the principles are equally applicable to analogue audio signals in an analogue part of the signal path.

The first and second compensation functions, and thus the gain factors λ and ρ, are based on an impedance value for at least part of the common return path and also on an impedance value related to the impedance of the audio load. However in embodiments of the present invention the relevant impedance value is a band adjusted impedance value, i.e. an impedance value that is selected to give good crosstalk mitigation across the whole of the frequency band of interest. In various embodiments the band adjusted impedance value is based on a determined DC impedance value for an audio load that is modified by a band correction factor.

In some embodiments the band adjusted impedance value may be an estimate of the mean impedance across substantially the whole of the frequency band of interest.

As noted above crosstalk is substantially cancelled when the gain factors λ and ρ have the values defined by equation 3 above. However the impedance of the audio load $Z_L$ or $Z_R$ is frequency dependent and thus the degree of crosstalk cancellation provided will vary with frequency. In general, and assuming for now that the left and right loudspeakers have the same DC impedance $Z_{DC}$, the value λ (and equally the value ρ) would be given by:

$$\lambda = \frac{-R_C}{R_C + Z(f)} \quad \text{Eqn. (4)}$$

where Z(f) is the function of how the impedance of the audio load varies with frequency. In general the gain factor λ could be estimated using the mean of the impedance of the audio load across the frequency band, i.e. as:

$$\lambda = \frac{-R_C}{R_C + \overline{Z}} \quad \text{Eqn. (5)}$$

The impedance of the audio load across the frequency band of interest could be determined as part of the host and/or accessory start-up process by applying a test signal having a predetermined frequency variation and measuring the impedance of the load. However this would involve applying a driving signal to the loudspeakers in the audio frequency band of interest which would clearly result in audible artefacts. In at least some applications this will be undesirable.

In some embodiments therefore to provide a simple estimate of the mean impedance of the audio load over the frequency band, the DC impedance value $Z_{DC}$ may be determined and modified by a band correction factor γ. In such embodiments the band correction factor may be a multiplicative band correction factor, i.e. the DC impedance value is multiplied by the band correction factory γ to provide the band adjusted value. Thus the values of λ and ρ can be determined according to:

$$\lambda = \rho = \frac{-R_C}{R_C + \gamma Z_{DC}} \quad \text{Eqn. (6)}$$

It will be clear from the discussion above the band correction factor γ modifies the DC impedance value, i.e. results in a different value, and thus the band correction factor γ is not equal to 1, i.e. it is non-unity.

The band correction factor γ may be a predetermined correction factor which is applied in use when driving any connected audio load. In some applications it may be the case that the audio load or loads which may be driven by the audio circuitry in use may have broadly similar impedance characteristics over the frequency band of interest. Thus a suitable band correction factor γ could be determined that is appropriate for the known likely audio loads or loads and used in all cases. For example in some applications there may be a limited range of peripheral devices that could be attached in use, all of which may have a relatively mean impedance over the frequency band of interest. A suitable band correction factor γ could therefore be derived, e.g. by testing, and the audio driving circuitry configured to use such a fixed band correction factor.

In some cases however the audio driving circuitry may be used with a variety of different audio loads having relatively different impedance characteristics over the frequency band of interest, and thus the optimal band correction factor γ may differ for at least some of the possible audio loads. In such applications it may still be the case that use of a fixed band correction factor provides an overall benefit. It may be the case that a band correction factor γ can be selected that would improve the crosstalk mitigation for all possible loads compared to use of the DC value of impedance on its own, even though the value will not be as optimal for at least some audio loads. It may be the case that the band correction factor γ selected actually results in a poorer crosstalk cancellation for some loads (compared to using an unmodified value of DC impedance) but the performance benefits for other possible loads provides overall benefit, i.e. if use of the DC value of impedance provided good crosstalk cancellation for some audio loads but poorer crosstalk cancellation for other possible loads it may be beneficial to use a band correction factor that provides acceptable crosstalk cancellation for all audio loads.

Figure 3:
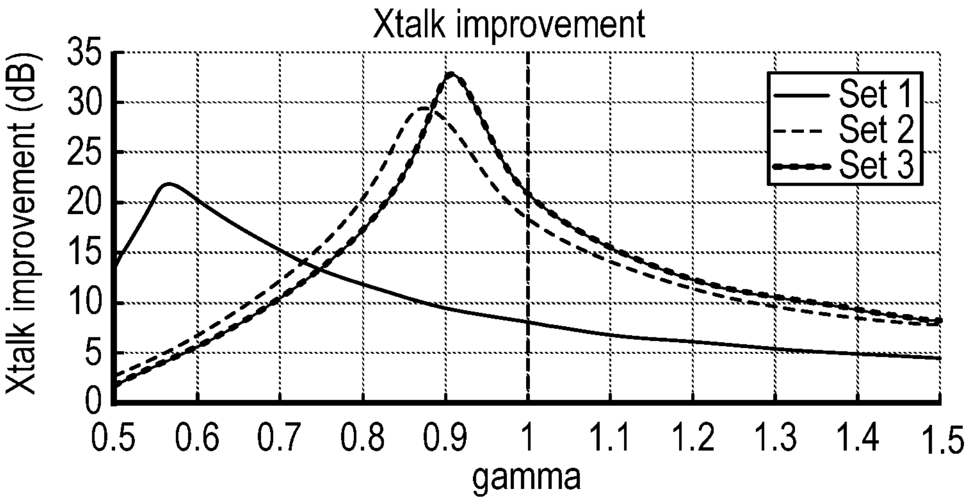
FIG. 3 illustrates the extent of crosstalk reduction for various audio loads for different values of band correction factor.

FIG. 3 illustrates how crosstalk improvement varies with different values of band correction factor γ for various different audio loads. FIG. 3 illustrates the average amount of crosstalk reduction across the whole frequency band of interest at different values of the band correction factor γ for various different audio loads. In this case the various audio loads were high performance headphones and the testing simulated headphone driving circuitry of a portable electronic device.

It can be seen that the methods described above can provide significant crosstalk reduction and applying a non-unity multiplicative band correction factor γ can provide a significant benefit for these test cases.

It will be seen however that the value of the band correction factor that provides the best overall crosstalk improvement may differ from load to load. For example for two of the test loads the best performance is achieved with a band correction factor γ around 0.9 whereas the other load experiences the best improvement at a value of γ of about 0.55. In this case the value of γ may be chosen to be around 0.9 to provide near optimal performance for two of the possible loads and still provide an improvement for the other test case compared to using just the DC value of impedance with no band correction.

It will be appreciated that for some loads it may be the case that the chosen value of band correction factor could actually result in worse performance compared to simply using the unadjusted determined DC impedance value. However if a certain band correction value, say 0.9 for example, provides a significant improvement for most expected loads it may beneficial to improve the performance for most loads even if this results in poorer performance with some loads.

Figure 4:
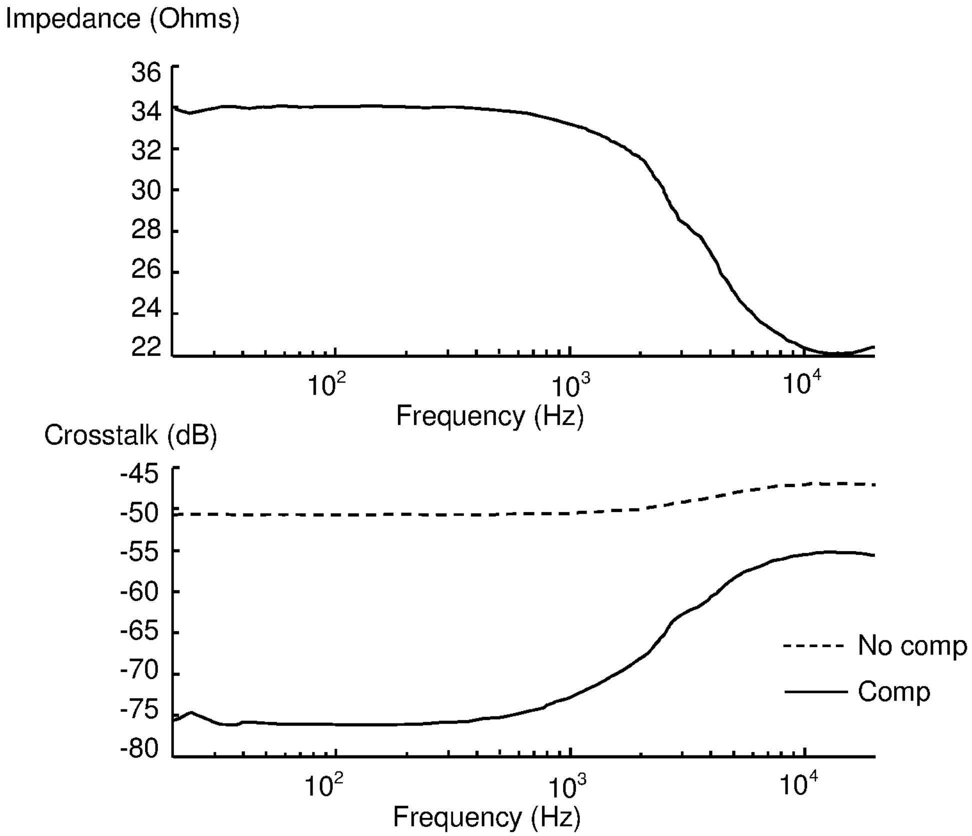
FIG. 4 illustrates the variation of impedance and crosstalk reduction with frequency for one audio load.

FIG. 4 illustrates the results of applying the technique of crosstalk mitigation discussed to an individual audio load. In this instance the crosstalk mitigation was applied with first and second compensation functions according to equation 6 being used to derive the gain factors applied, with a fixed band correction factor γ of 0.9 being used. The top plot of FIG. 4 illustrates how the impedance of this particular load varies over the frequency band of interest. In this case the DC impedance was 35.1 ohms and the mean impedance over the frequency band was 24.4 ohms. For this particular load the mean value of impedance across the band is actually about 0.7 times the DC impedance value, and the band corrected impedance value of $0.9*Z_{DC}$ is thus a better estimate of the impedance across the frequency band. The lower plot illustrates the extent of crosstalk between the loudspeakers as a function of frequency and illustrates the crosstalk with and without the compensation signals being applied.

In at least some embodiments the band correction factor γ may be selected depending on a characteristic of the audio load connected, in other words rather than use a fixed band correction factor for all loads the band correction factor γ used may be configurable in some way based on a determined characteristic of the load. For instance the band correction factor γ applied may vary depending on the DC impedance of the connected load, at least within certain impedance bands. It may be that audio loads having a DC impedance in a first range may have a broadly similar impedance-frequency characteristics and thus a first band correction factor γ1 may be advantageously used for such loads whereas for audio loads having a DC impedance value in a second, different, range a second different band correction factor γ2 may provide better crosstalk compensation.

In any event whether the band correction factor γ is a predetermined fixed factor that is used for all load or a variable γ1-γN that varies in some way with the load connected, the band correction factor is applied to an estimate of the DC impedance of the connected load.

It may in some applications be possible to simply assume a value of the DC impedance of the connected audio load, for instance for applications where it is known that the audio load will have a particular DC impedance value or will fall into a relatively narrow range of impedance values.

Advantageously however in embodiments of the invention the DC impedance for the connected load is determined. In some embodiments the impedance may be measured, for instance a characteristic of the load may be measured to determine an indication of a suitable DC impedance value for the connected load. Thus the impedance value for the audio load used for the first and second compensation functions may be based on a measured DC impedance value for one of the first and second audio loads which is modified by the band correction factor.

Referring back to FIG. 2 the host device in this example thus comprises impedance measuring blocks 208 for measuring an impedance value of a connected audio load. On detection of a connected peripheral apparatus, which may occur at power-on or reset of the audio driving circuitry or connection of a suitable peripheral apparatus, the impedance measuring blocks 208 determine a DC impedance value for the connected loads. Detection of a connected peripheral apparatus may occur through a plug-insert type detection as will be well understood by one skilled in the art and will not be described further.

Figure 5:
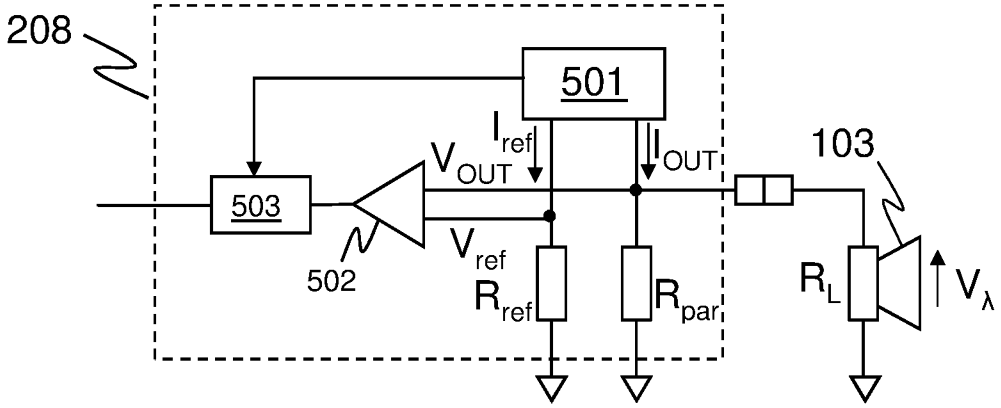
FIG. 5 illustrates one example of an impedance measuring block.

FIG. 5 illustrates one example of a suitable impedance measuring block 208. A current DAC 501 generates an output current $I_{OUT}$ that is applied to the output terminal, and hence the audio load and also a known resistance $R_{par}$. A reference current $I_{ref}$ is also applied to a reference resistance $R_{ref}$ and the resultant voltages $V_{OUT}$ and $V_{ref}$ compared by comparator 502. In some embodiments the output current may be ramped or stepped up at a relatively slow rate, say of the order of 1 mV/ms to avoid audible artefacts, until the output of the comparator 502 toggles. Knowing the reference current and resistances $R_{ref}$ and $R_{par}$ the impedance of the connected load may thus be determined by a suitable logic circuit 503 by the output current at the point at which the comparator output toggles.

It should be noted from the discussion above that this measure of DC impedance value may not be particularly representative of the mean impedance of the audio load across the frequency band of interest and thus the measurement of DC impedance need not be particularly accurate or precise. For instance it may be sufficient to categorise the audio load as having a DC impedance value with a certain impedance range.

FIG. 2 illustrates two impedance measuring blocks 208, one for each connected audio load. In some embodiments it may be advantageous to measure the DC impedance of each audio load separately and define appropriate compensation functions for each signal path based on the measured DC impedances. Thus a measure of the DC impedance of the first audio load may be used to define the second compensation function and a measure of the DC impedance of the second audio load may be used to define the first compensation function. In many applications however, especially for stereo headset or the like, the DC impedance of the first and second loads are likely to be substantially the same and thus it would be sufficient to measure the DC impedance of just one of the connected audio loads and use that DC impedance value to define both the first and second compensation functions.

The measured impedance value(s) $Z_L$ and/or $Z_R$ may be provided by the impedance measuring block(s) 208 to the crosstalk compensation block controller 207 which may thus determine the first and second compensation functions, e.g. the gain factors λ and ρ. As discussed above the controller 207 may use a fixed band correction factor γ, which may be stored in a suitable memory for instance, or may select an appropriate band correction factor based on a determined characteristic of the connected load.

Whilst conveniently the DC impedance of a connected audio load may be determined by an impedance measuring block, in some embodiments the DC impedance of a connected load may be determined in other ways. For instance some peripheral devices may be arranged such that a host device can read at least some information from the peripheral device when connected. This may for instance be an identifier allowing the host device to identify the type of peripheral device or accessory connected. In such a case the host device may comprise a look-up table or the like storing impedance values for the various types of peripheral devices that may be connected. If a peripheral device is connected and successfully identified the relevant impedance value(s) for the audio loads of that peripheral device may be retrieved from storage and provided as the determined DC impedance value. In such embodiments an appropriate band correction factor for the audio loads of that peripheral device may also be stored and retrieved once the relevant peripheral device is identified. In some embodiments the stored impedance value could be a band adjusted impedance value, i.e. the DC impedance value after it has already been modified by the band correction factor.

In some embodiments the information that may be read by the host device from the peripheral device when connected may include an indication of a DC impedance value for the audio loads of the peripheral device, i.e. the peripheral device may be configured to communicate to the host device the relevant DC impedance value to be modified and used for crosstalk mitigation.

The first and second compensation functions λ and ρ are also determined based on an indication of the impedance of at least part of the common return path. As illustrated in FIG. 2, where the audio driving circuitry is used to drive a connected peripheral apparatus such as a headset, the impedance of the common return path can be seen as two separate impedances in series. A first common impedance $R_{H1}$ is associated with the part of the common return path within the host electronic device 201. This may for instance include any impedance associated with the relevant connector, e.g. an impedance of a socket, and the return path within the device, e.g. a trace on a PCB or the like. A second common impedance $R_{H2}$ is associated with the connected peripheral apparatus 202, e.g. an impedance of the relevant connector, e.g. plug contact, of the peripheral apparatus and cable between the connector and the loudspeakers.

The first common impedance $R_{H1}$ is fixed for the host device, whereas clearly the second common impedance may vary depending on the type of peripheral apparatus connected. It has been appreciated that the first common impedance may be determined and used as an indication of the impedance of the common return path $R_C$. In other words in embodiments of the invention the first and second compensation functions may be determined using the first common impedance $R_{H1}$, i.e. a value of the impedance of that part of the common return path within the host device.

The value of the first common impedance may be determined based on a knowledge of the design of the host device but in some embodiments the first common impedance may have been determined in a calibration process. A calibration process could be performed at device assembly stage for each device to determine the value of the first common impedance for that device or a calibration process could be applied to a representative sample of the same type of host device and the results of the calibration process used for all instances of that device.

The value of the first common impedance may be determined in a variety of different ways as will be understood by one skilled in the art. In one suitable calibration process the first common impedance may be determined by connecting test loads to the host device, using an arrangement where any second common impedance is minimal, and determining the amount of crosstalk that occurs when driving the loads without any crosstalk mitigation being applied. From equation 1 above it can be seen that by taking $R_{H1}$ as the only significant contribution to $R_C$ and setting $Z_R=Z_L=Z_{DC}$ then the first common impedance can be determined as:

$$R_{H1} = \frac{XT * Z_{DC}}{1 - 2 \cdot XT} \qquad \text{Eqn. (7)}$$

where XT is the measured degree of crosstalk.

Thus in at least some embodiments the first and second compensation functions are based on equation 6 above where the value $R_C$ is based on a measured value of the first common impedance $R_{H1}$ of the host device which is determined in a calibration step. In some embodiments the value $R_C$ may be set to be equal to the measured first common impedance value, i.e. any contribution to the impedance of the common return path of the peripheral apparatus is effectively ignored. Thus a predetermined value of the first common impedance $R_{H1}$ may be stored for use by the crosstalk compensation block controller 207.

The discussion above has focused on just taking the effective DC resistance of the audio load, e.g. loudspeaker, into account as the impedance of the audio load. In some embodiments however it may be advantageous to include inductance effects as at least part of the band correction factor.

If the inductance of the audio load is taken into account the impedance of the audio load can be seen as a series connection of effective resistance and inductance, thus:

$$Z_L=Re_L+Le_L \quad Z_R=Re_RLe_R \qquad \text{Eqn. (8)}$$

where $Re_L$ and $Re_R$ are the effective resistances of the first and second loads and $Le_L$ and $Le_R$ the respective inductances.

The DC resistance of the audio load can be determined as described above. The inductance of a connected load may be determined from inaudible ultrasonic measurement (assuming a one-pole model) as would be understood by one skilled in the art. In some embodiments therefore the impedance measuring blocks 208 may also function as inductance measuring blocks.

In such a case the compensation signal generators 206 may thus be configured to a function based on resistance and also inductances and in some embodiments may effectively be low pass filters. Adding the impedances including inductances as defined in equation 8 into the compensation functions defined at equation 3 gives:

$$\lambda = \rho = \frac{-R_C}{R_C + Re + sLe} \qquad \text{Eqn. (9)}$$

where sLe is the inductance of the audio load in the form of the s-domain. In this example the inductance term thus represents the band correction factor which is used to modify the DC impedance value Re. It will be clear that the inductance term is (in this domain) an additive correction factor.

In this case the compensation signal generators 206 may apply a degree of low pass filtering as well as gain adjustment.

Figure 6:
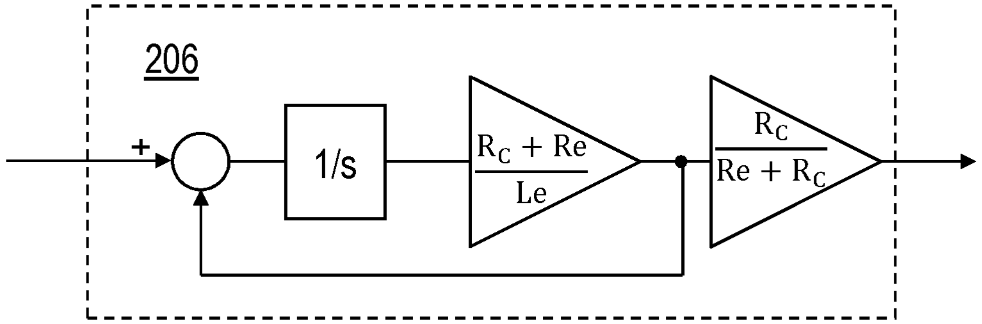
FIG. 6 illustrates a compensation signal generator according to an embodiment of the invention.

FIG. 6 illustrates one example of a suitable compensation generator for implementing the compensation function defined by equation 9 (transferred to the S-domain).

Figure 7:
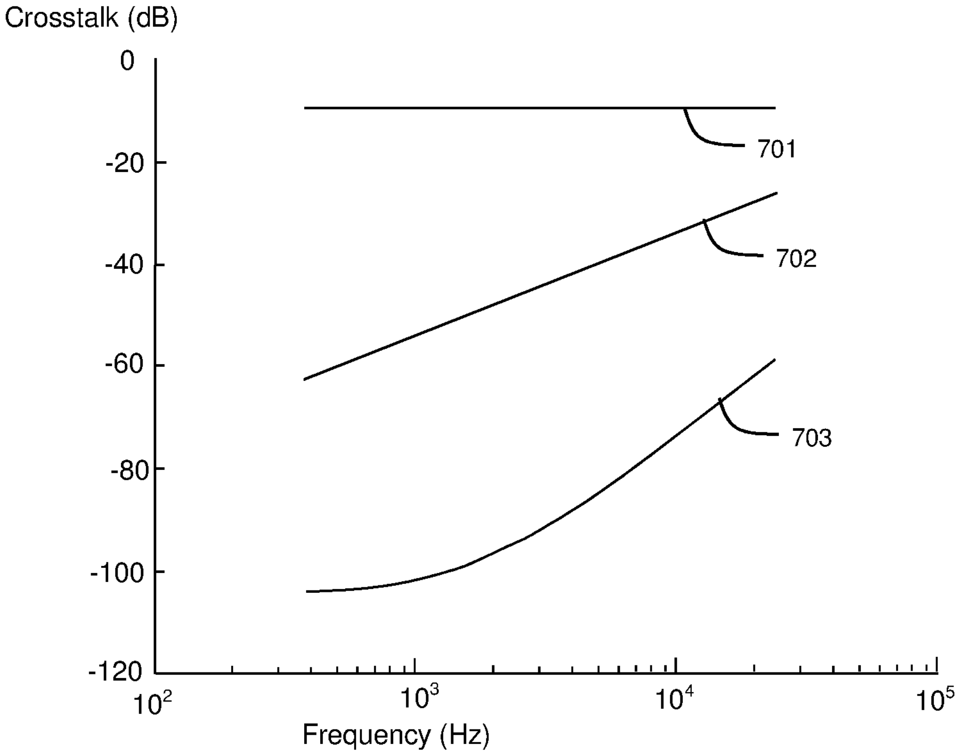
FIG. 7 illustrates the performance of crosstalk mitigation including inductance.

FIG. 7 illustrates how including inductance can improve crosstalk mitigation. FIG. 7 shows simulated results for an audio system where the audio load resistance Re is 16 ohm and inductance is 20 μH. The impedance of the common return path was simulated as 0.2 ohm. Plot 701 shows the resulting crosstalk without any crosstalk compensation being applied. Plot 702 shows the resulting crosstalk using a conventional crosstalk compensation function such defined in equation 3, without any band correction. Plot 703 illustrates the resulting crosstalk where inductance effects are included as a band correction factor, i.e. using compensation functions of the form set out at equation 9.

It can be seen that the inclusion of inductance terms can provide a significant reduction in crosstalk compared to conventional crosstalk reduction. As mentioned previously a measure of the inductance of the audio load can be made on connection without any audible audio artefacts.

As noted above in some embodiments an initial measure of DC impedance of a connected audio load may be made when a load is detected as being connected, e.g. on jack detect or following power on or reset of the audio diving circuitry, and this initial measure of DC impedance modified by a band correction factor, γ, to provide a band adjusted impedance value which is likely to be more representative of the impedance of the load over the frequency band of interest, e.g. an estimate of the likely mean impedance. The measure of DC impedance can be made without any audible artefacts being apparent to a user. In at least some embodiments this initial band adjusted impedance value may be modified in use based on measurements of how the impedance of the audio load actually varies in use. In other words the impedance of the loudspeaker may be monitored in use when driven the first or second driving signal and this measurement of impedance in use may be used to refine the impedance value used in the compensation functions. Thus a DC measure of impedance of the audio load may be acquired on initial detection of a connected load and used as an initial value for the first and second compensation functions. However this value may be modified, i.e. the band correction factor applied may effectively be controlled in use, based on in use measurements of the impedance of the audio load across the frequency band of interest.

Measurement of the impedance of the loudspeaker in use may be performed in a number of different ways, for instance by monitoring a signal indicative of the driving voltage applied to the loudspeaker and also the current through the loudspeaker. Various techniques for monitoring the impedance of a loudspeaker in use without interfering with operation are known and may be used. The impedance measuring blocks 208 may therefore be arranged so as to monitor the impedance of the audio loads in response to the driving signals. The loudspeaker response, e.g. the voltage and/or current signals, could be filtered using one or more filters to provide an indication of the impedance response of the loudspeaker in various frequency bands.

For example in some embodiments the impedance measuring block(s) 208 may receive an indication of the current through the voice coil of the loudspeaker. This current $I_{spka}$ may, for example, be sensed in a power supply or ground return lead, monitored in series with the load, or monitored by sensing current through or voltage across amplifier output elements. The impedance measuring block 208 also receives an indication of the voltage $V_{spka}$ applied to the loudspeaker, i.e. the drive voltage is monitored. In some instance the digital audio signal may be used as an indication of the drive voltage, e.g. the input to DAC 101. However it would alternatively be possible to monitor the drive signal $V_L$ or $V_R$ directly. The impedance measuring block 208 may determine an estimate of the present resistance Re of the voice coil, for example based on the relationship $Re=V_{spk}/I_{spk}$, although more sophisticated known techniques such as those involving adapting coefficients of an adaptive filter may be used if desired.

The determined impedance response to the driving signals may be used to provide a better indication of the impedance of the audio load across the frequency band of interest. From the monitored impedance over time the band correction factor may effectively be refined so as to provide a band adjusted impedance value that provides good crosstalk mitigation across the frequency band of interest for the particular connected load. In effect a band adjusted impedance value based on actual measured impedance may be determined, e.g. an estimate of the mean impedance across the frequency band of interest, and the initial value of band adjusted impedance value modified accordingly.

Depending on the audio content of the input audio signal it may take of the order of a few hundreds of milliseconds to a second or so to determine a reasonable estimate of impedance across the frequency band of interest. In some embodiments it may be possible to use a DC value of impedance initially and only modify this DC impedance value once the estimate of impedance across the frequency band of interest has been determined.

Note that as used herein the term 'block' is used to refer to a functional unit or module which may be implemented at least partly by dedicated hardware components such as custom defined circuitry and/or at least partly be implemented by one or more software processors or appropriate code running on a suitable general purpose processor or the like. A block may itself comprise other blocks or functional units.

It will of course be appreciated that various embodiments of the audio driving circuitry discussed above or various blocks or parts thereof, such as the crosstalk compensation block or impedance measuring block(s), may be co-integrated with other blocks or parts thereof or with other functions of a host device on an integrated circuit such as a Smart Codec. For example impedance measurement of a connected audio load may be useful for other functions such as loudspeaker excursion limiting and/or thermal protection.

It will be appreciated that the audio circuitry may be any suitable type of audio circuitry for driving multichannel audio loads. The output drivers may comprise at least one amplifier. An amplifier used in the audio circuitry may be any of: class A; class A/B; class B; class D; class G and/or class H.

It will also be appreciated that the common return path may, in some embodiments, comprise elements such as reference amplifier such that each load is connected between two amplifiers in an arrangement similar to a Bridge-tied-load. In which case the impedance of the common return path may be based, at least in part, on the impedance of the reference amplifier arrangement.

The skilled person will thus recognize that some aspects of the above-described apparatus and methods, for example the determination of gain factors according to the compensation functions, may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware Embodiments of the invention may be arranged as part of an audio processing circuit, for instance an audio circuit which may be provided in a host device. A circuit according to an embodiment of the present invention may be implemented as an integrated circuit. Loudspeakers may be connected to the integrated circuit in use.

Embodiments may be implemented in a host device, especially a portable and/or battery powered host device such as a mobile telephone, an audio player, a video player, a PDA, a mobile computing platform such as a laptop computer or tablet and/or a games device for example.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed as so as to limit their scope. Terms such as "apply a gain" include possibly applying a scaling factor of less than unity to a signal.

The invention claimed is:

1. An audio driver circuit for driving first and second audio loads having a common return path, the circuit comprising:

a first signal path for receiving a first audio signal and outputting a first driving signal for driving the first audio load;

a second signal path for receiving a second audio signal and outputting a second driving signal for driving the second audio load;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a predetermined impedance value for at least part of the common return path and is also based on a determined DC impedance value for one of the first and second audio loads which is modified by a band correction factor;

wherein the first and second compensation functions have the form $R_C/(R_C+\gamma Z_{DC})$ where $R_C$ is said predetermined impedance value for at least part of the common return path, $Z_{DC}$ is the determined DC impedance value for one of the first and second audio loads and $\gamma$ is the band correction factor.

2. An audio driver circuit as claimed in claim 1 wherein said determined DC impedance value is a measured DC impedance value for one of the first and second audio loads.

3. An audio driver circuit as claimed in claim 2 further comprising at least one impedance measuring block configured to determine said measured DC impedance value for at least one of the first and second audio loads when connected.

4. An audio driver circuit as claimed in claim 1 wherein the band correction factor is configured such that the determined DC impedance value modified by the band correction factor provides an estimate of a mean impedance of the audio load over a frequency band of interest.

5. An audio driver circuit as claimed in claim 1 wherein the band correction factor is predetermined.

6. An audio driver circuit as claimed in claim 1 wherein the band correction factor is selected based on a characteristic of one of the first and second audio loads.

7. An audio driver circuit as claimed in claim 6 wherein said characteristic of one of the first and second audio loads is the determined DC impedance value.

8. An audio driver circuit as claimed claim 1 wherein the band correction factor is a multiplicative factor.

9. An audio driver circuit as claimed in claim 1 wherein the band correction factor is based on a determined inductance of at least one of the first and second audio loads.

10. An audio driver circuit as claimed in claim 9 wherein said determined inductance is a measured inductance for one of the first and second audio loads.

11. An audio driver circuit as claimed in claim 1 wherein the first and second compensation functions define a gain factor to be applied to the respective second and first audio signals to generate the first and second compensation signals.

12. An audio driver circuit as claimed in claim 1 comprising an impedance measuring block configured to measure the impedance of at least one of the first and second audio loads in use when driven by the respective first or second driving signal, wherein the crosstalk compensation block is configured to control the band correction factor based on the measured impedance in use.

13. An audio driver circuit as claimed in claim 1 wherein said predetermined impedance value for at least part of the common return path is a first common impedance value indicative of an impedance of a first part of the common return path, said first part of the common return path being within a host device hosting the audio driver circuit.

14. An audio driver circuit as claimed in claim 13 wherein the first common impedance value is based on a measured calibration value of the impedance of the first part of the common return path.

15. An electronic apparatus comprising the audio driver circuit as claimed in claim 1 further comprising a connector for connecting to a peripheral audio apparatus, the connector having a first contact for receiving the first driving signal for driving the first audio load, a second contact for receiving the second driving signal for driving the second audio load, and a third contact for providing the common return path for second first and second audio loads.

16. An audio driver circuit for driving first and second audio loads having a common return path, the circuit comprising:

a first signal path for receiving a first audio signal and outputting a first driving signal for driving the first audio load;

a second signal path for receiving a second audio signal and outputting a second driving signal for driving the second audio load;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a predetermined impedance value for at least part of the common return path and is also based on a determined DC impedance value for one of the first and second audio loads which is modified by a band correction factor;

wherein the band correction factor is based on a determined inductance of at least one of the first and second audio loads;

wherein the first and second compensation functions have the form $R_C/(R_C+(ZDC+sLe))$ in the s-domain where $R_C$ is said predetermined impedance value for at least part of the common return path, ZDC is the determined DC impedance of one of the first and second audio loads and sLe is the band correction factor and is said determined inductance.

17. An audio driver circuit for driving first and second audio loads having a common return path, the circuit comprising:

a first signal path for receiving a first audio signal and outputting a first driving signal for driving the first audio load;

a second signal path for receiving a second audio signal and outputting a second driving signal for driving the second audio load;

a crosstalk compensation block configured to add a first compensation signal to the first signal path and add a second compensation signal to the second signal path;

the crosstalk compensation block being configured to generate the first compensation signal based on the second audio signal and a first compensation function and to generate the second compensation signal based on the first audio signal and a second compensation function;

wherein each of the first and second compensation functions is based on a predetermined first common impedance value for part of the common return path and an impedance value of one of the first or second audio loads modified by a band correction factor;

wherein the band correction factor is based on a determined inductance of at least one of the first and second audio loads; and wherein the first and second compensation functions have the form $R_C/(R_C+(Z_{DC}+sLe))$ in the s-domain where $R_C$ is said predetermined impedance value for at least part of the common return path, $Z_{DC}$ is the determined DC impedance of the audio load and sLe is the band correction factor and is said determined inductance.

18. Crosstalk compensation circuitry for compensating for crosstalk in first and second signal paths for driving respective first and second audio loads having a common return path, the crosstalk compensation circuitry comprising:

a first compensation signal generator configured to generate a first compensation signal for the first signal path, the first compensation signal being based on a signal from the second signal path and a first compensation function;

a second compensation signal generator configured to generate a second compensation signal for the second signal path, the second compensation signal being based on a signal from the first signal path and a second compensation function;

an impedance measuring block configured to determine an impedance of at least one of the first and second audio loads; and a crosstalk compensation controller configured to:

determine a band impedance value for the first and second audio loads based on said determined impedance, said band impedance value being indicative of an impedance over an operating frequency band; and generate the first and second compensation functions based on said determined band impedance value;

wherein the first and second compensation functions have the form $R_C/(R_C+\gamma.Z_{DC})$ where $R_C$ is said predetermined impedance value for at least part of the common return path, $Z_{DC}$ is the determined impedance and $\gamma.Z_{DC}$ is the band impedance value.

* * * * *